Sept. 26, 1950 H. B. BUDACK 2,523,419
LEVEL INDICATOR WITH STAR WHEEL DAMPER
Filed Dec. 16, 1949

INVENTOR.
HENRY B. BUDACK,
BY
McMorrow, Berman & Davidson
ATTORNEYS.

Patented Sept. 26, 1950

2,523,419

UNITED STATES PATENT OFFICE 2,523,419

LEVEL INDICATOR WITH STAR WHEEL DAMPER

Henry B. Budack, Sacramento, Calif.

Application December 16, 1949, Serial No. 133,305

4 Claims. (Cl. 33—220)

This invention relates to improvements in level indicators, such as carpenters' levels, and more particularly a pendulum-operated level having a damper mechanism for damping movements of the pendulum after a change in the relative position thereof.

It is among the objects of the invention to provide an improved indicator of the character including an elongated body, a container mounted in the body, a shaft journaled in the container, a pendulum in the container suspended from the shaft, a dial adjacent the container, and a pointer operatively connected to the pendulum and movable over the dial to indicate the relative position of the pendulum and the container, damping means for effectively damping movements of the pendulum after a change in the position thereof, and to provide an improved indicator which is particularly simple and durable in construction and economical to manufacture, and which is extremely accurate and easy to use because of the rapid subsidence of the swinging or oscillating movements of the pendulum and the absence of hunting by the pendulum and pointer.

Figure 2:
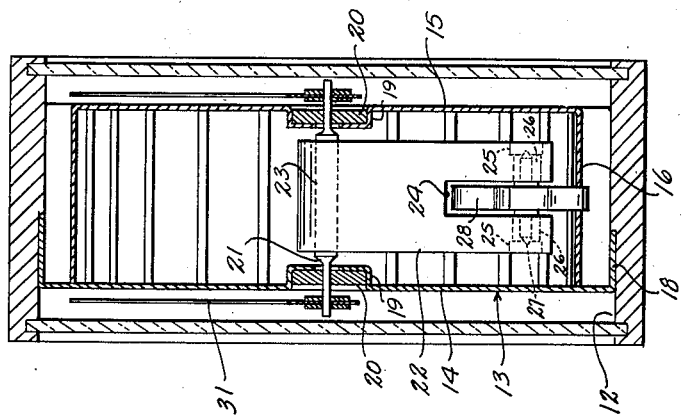
Figure 1:
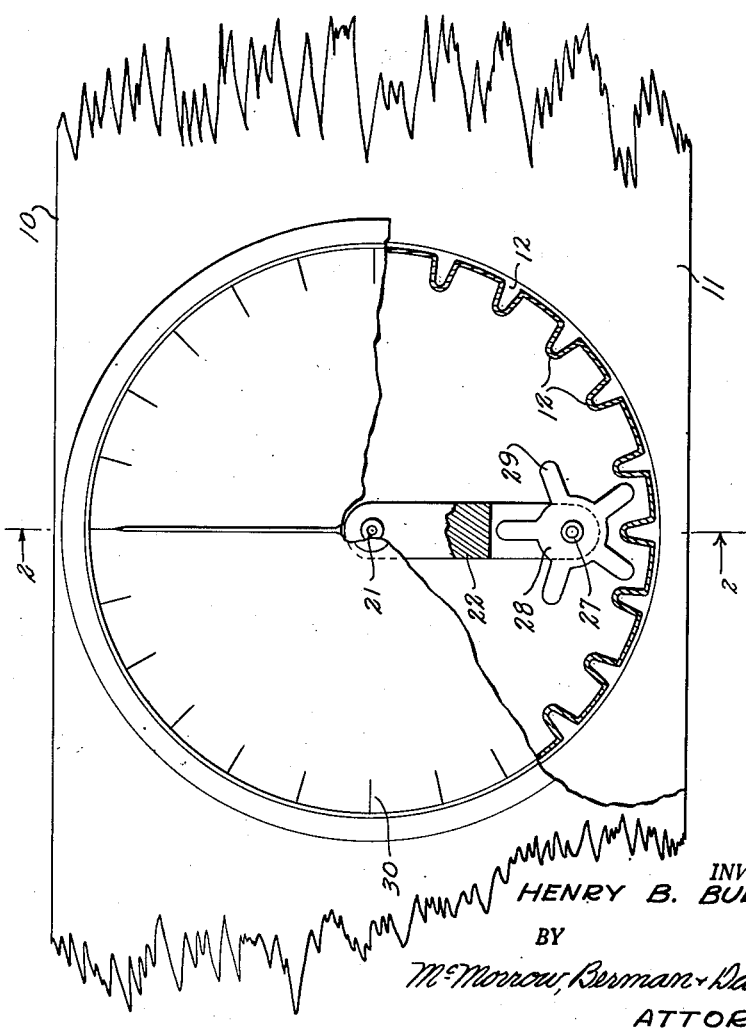

Other objects and advantages will become apparent from a consideration of the following description and the appended claims in conjunction with the accompanying drawing, wherein:

Figure 1 is a side elevation of a level indicating device illustrative of the invention, a portion being broken away and shown in cross-section to better illustrate the construction thereof; and Figure 2 is a transverse cross-section taken on the line 2—2 of Figure 1.

With continued reference to the drawing, the improved level indicator comprises an elongated bar or body 10 formed of wood, metal, synthetic resin plastic or other suitable material and provided with at least one plane, work-contacting surface 11. Body 10 is preferably of rectangular cross-section and provided intermediate its length with a circular opening 12 which receives a cylindrical container, generally indicated at 13. Container 13 comprises two flat, substantially parallel end walls 14 and 15 of circular shape and an annular wall extending between the two end walls and comprising respective annular flanges extending outwardly from the end walls around the edges thereof.

End wall 15 is provided with an annular flange 16 which extends transversely across the space between the two end walls and is corrugated to provide transversely-extending, angularly-spaced tooth formations 17 having substantially straight sides and rounded inner ends. Side wall 14 is provided with an annular flange 18 which telescopically receives the flange 16 and contacts the outer surface of this flange between the corrugations 17.

End walls 14 and 15 are provided with inwardly-directed circular recesses 19 substantially centrally thereof in which recesses are mounted apertured bearings 20 in which the reduced end portions of a shaft 21 are journaled.

Pendulum 22 comprises an elongated body of rectangular cross-section having rounded ends and is provided near one end with a transverse aperture 23 through which the shaft 21 extends to suspend the pendulum in the container 13. Near its opposite or lower end the pendulum is provided with a centrally-disposed transverse slot 24 opening to the lower end of the pendulum and with transverse apertures 25 near its lower end and disposed one at each side of the slot. Respective bearings 26 mounted in the apertures 25 journal the reduced end portions of a shaft 27 and a star wheel 28 is mounted on shaft 27 for rotation relative to pendulum 22. Star wheel 28 has angularly-spaced arms 29 which extend radially outwardly and operatively engage the tooth formations 17 to turn the star wheel as the pendulum swings about the axis of shaft 21.

A dial 30 is provided on the outer side of at least one of the container end walls and a pointer 31 is mounted on the corresponding end of shaft 21 and is movable over the dial upon movement of the pendulum 22 in the container.

It will be noted that the star wheel teeth are much longer than the tooth formation 17 in the container annular wall and that the space between the tooth formations is greater than the width of the star wheel teeth and also that the space between the star wheel teeth is greater than the width of the tooth formations. This provides a loose turning engagement between the star wheel and the tooth formations which produces a large amount of friction while the star wheel teeth are in contact with the tooth formations to turn the star wheel which friction quickly dampens the energy of movement in the pendulum 22 and brings the pendulum to a condition of rest in the container. The spacing between the tooth formations and the star wheel teeth frees the pendulum of any resistance in seeking its exact gravitational position in the container so that the pointer accurately indicates the relative position of the pendulum and consequently the inclination of the surface 11 of the level body. The anti-friction bearings 20 reduce the friction of the mounting of shaft 21 to a minimum which also increases the accuracy of the indicator. By forming the container of thin, malleable metal, upsetting the marginal flanges and corrugating the flange 16, the construction is made extremely simple and economical so that the device can be marketed at a very low cost, even though it is extremely accurate and is effectively damped so that the desired indication is available almost immediately after the surface 11 of the body 10 has been applied to the work surface to be tested.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In an indicator including a container having a pair of substantially parallel, circular end walls and an annular wall between said end walls, a shaft journaled in and extending between said end walls, a pendulum suspended from said shaft in said container, a dial adjacent said container, and a pointer operatively connected with said pendulum and movable over said dial, damping means for said pendulum comprising angularly-spaced tooth formations in said casing annular wall, a shaft mounted on said pendulum, and a star wheel on said shaft engageable with said tooth formations upon movement of said pendulum in said container to convert energy of movement into friction to thereby dampen the movements of said pendulum.

2. In an indicator including a container having a pair of substantially parallel, circular end walls and an annular wall between said end walls, a shaft journaled in and extending between said end walls, a pendulum suspended from said shaft in said container, a dial adjacent said container, and a pointer operatively connected with said pendulum and movable over said dial, damping means for said pendulum comprising angularly-spaced tooth formations in said casing annular wall, a shaft mounted on said pendulum, and a star wheel on said shaft engageable with said tooth formations upon movement of said pendulum in said container to convert energy of movement into friction to thereby dampen the movements of said pendulum, said pendulum having an opening through the lower portion thereof receiving said star wheel.

3. In an indicator including a container having a pair of substantially parallel, circular end walls and an annular wall between said end walls, a shaft journaled in and extending between said end walls, a pendulum suspended from said shaft in said container, a dial adjacent said container, and a pointer operatively connected with said pendulum and movable over said dial, damping means for said pendulum comprising angularly-spaced tooth formations in said casing annular wall, a shaft mounted on said pendulum, and a star wheel on said shaft engageable with said tooth formations upon movement of said pendulum in said container to convert energy of movement into friction to thereby dampen the movements of said pendulum, said annular container wall comprising an annular flange on one of said end walls transversely corrugated to provide said tooth formations.

4. In an indicator including a container having a pair of substantially parallel, circular end walls and an annular wall between said end walls, a shaft journaled in and extending between said end walls, a pendulum suspended from said shaft in said container, a dial adjacent said container, and a pointer operatively connected with said pendulum and movable over said dial, damping means for said pendulum comprising angularly-spaced tooth formations in said casing annular wall, a shaft mounted on said pendulum, and a star wheel on said shaft engageable with said tooth formations upon movement of said pendulum in said container to convert energy of movement into friction to thereby dampen the movements of said pendulum, said annular container wall comprising an annular flange on one of said end walls transversely corrugated to provide said tooth formations, and an annular flange on the other of said end walls telescopically receiving said first-mentioned flange and contacting the outer surface of said first-mentioned flange between said corrugations.

HENRY B. BUDACK.

No references cited.